United States Patent [19]

Kanematu

[11] Patent Number: 4,521,594

[45] Date of Patent: Jun. 4, 1985

[54] PROCESS FOR PRODUCING SODIUM CARBOXYMETHYLCELLULOSE

[75] Inventor: Tetuo Kanematu, Himeji, Japan

[73] Assignee: Daicel Chemical Industries, Ltd., Osaka, Japan

[21] Appl. No.: 622,391

[22] Filed: Jun. 20, 1984

Related U.S. Application Data

[63] Continuation-in-part of Ser. No. 496,752, May 20, 1983, abandoned.

[51] Int. Cl.$^3$ .............................................. C08B 11/20
[52] U.S. Cl. ....................................... 536/98; 536/85; 536/87; 536/88
[58] Field of Search ................... 536/85, 87, 88, 98, 536/97

[56] References Cited

U.S. PATENT DOCUMENTS

| | | | |
|---|---|---|---|
| 2,288,200 | 6/1942 | Meyer | 536/85 |
| 2,639,239 | 5/1953 | Elliott | 536/87 |
| 2,879,268 | 3/1959 | Jullander | 536/87 |
| 3,379,721 | 4/1968 | Reid | 536/87 |
| 3,723,413 | 3/1973 | Chatterjee et al. | 536/97 |
| 3,731,686 | 5/1973 | Chatterjee | 536/87 |
| 4,400,502 | 8/1983 | Majewicz | 536/87 |

FOREIGN PATENT DOCUMENTS

| | | | |
|---|---|---|---|
| 528160 | 7/1956 | Canada | 536/87 |
| 1086323 | 10/1967 | United Kingdom | 536/98 |

*Primary Examiner*—Ronald W. Griffin
*Attorney, Agent, or Firm*—Flynn, Thiel, Boutell and Tanis

[57] ABSTRACT

A process for producing sodium carboxymethylcellulose having an excellent dispersibility in water by heat-treating sodium carboxymethylcellulose to crosslink the same. The starting sodium carboxymethylcellulose has an equivalent ratio of the free carboxylic acid group to the sodium carboxylate of at least 0.01 to 100 and a viscosity of at least 100 cP (as a 1% aqueous solution).

7 Claims, No Drawings

PROCESS FOR PRODUCING SODIUM CARBOXYMETHYLCELLULOSE

This is a continuation-in-part of U.S. Ser. No. 496,752 filed May 20, 1983, now abandoned.

The present invention relates to a process for producing sodium carboxymethylcellulose having an excellent dispersibility in water. More particularly, the invention relates to a process for producing sodium carboxymethylcellulose having an excellent dispersibility in water, which comprises thermally crosslinking sodium carboxymethylcellulose at a high temperature.

Generally, sodium carboxymethylcellulose (hereinafter referred to as Na-CMC) has a poor dispersibility in water and undissolved lumps are formed in the dispersion in many cases. Therefore, if Na-CMC is to be dissolved in water, it must be added in water in small portions under thorough stirring and a long time is required for the complete dissolution unfavorably.

There has been proposed a process for granulating Na-CMC to prevent the undissolved lump formation. However, the undissolved lumps are formed locally even by this process. This process is thus not always satisfactory. Another process has been known wherein Na-CMC is treated with glyoxal or the like. However, this process has defects that the treatment and pH control are troublesome and that uses of the product are limited, since its purity is lowered by adding the third component (glyoxal).

After intensive investigations made for the purpose of developing a process for producing Na-CMC without the addition of the third component as described above, the inventors have found a process for producing Na-CMC having a quite excellent dispersibility in water. The present invention has been completed on the basis of this finding.

A reason why Na-CMC forms undissolved lumps when it is dissolved in water is that Na-CMC has an extremely high affinity with water or solubility in water and, therefore, when it is contacted with water, the surface thereof is dissolved rapidly in water and, simultaneously, it is bonded with water molecules to retain the latter, whereby the penetration and diffusion of water into the Na-CMC particles are inhibited.

The inventors had a new idea of preventing the formation of undissolved lumps by partially introducing water-insoluble ester crosslinking bonds into the Na-CMC molecular chain by heat treatment to accelerate the penetration of water into the Na-CMC particles.

The present invention is based on the idea of heating a free carboxylic acid group (cell—O—$CH_2COOH$) contained in a small amount in Na-CMC at a high temperature to effect the crosslinking reaction (esterified cell—O—$CH_2COO$—cell) with an unsubstituted hydroxyl group in the Na-CMC molecular chain (cell—OH).

Na-CMC obtained by either an aqueous medium method or a solvent method may be used as the starting material in the present invention. The degree of substitution (hereinafter referred to as DS) of Na-CMC is not particularly limited. The degree of polymerization and viscosity of Na-CMC are closely related to heat treatment conditions. A 1% aqueous solution of Na-CMC should have a viscosity of at least 100 cP. Na-CMC having a viscosity of as low as below 100 cP has a short molecular chain and, therefore, the effect of preventing the undissolved lump formation cannot be obtained easily even after the crosslinking by heat treatment. As for the measure of heating conditions which vary depending on the viscosity of Na-CMC, a 1% aqueous solution having a viscosity of 100 to 1000 cP is heat-treated at 140° C. or a higher temperature for several hours, one having a viscosity of 1000 to 3000 cP is heat-treated at around 140° C. for 1 to 2 h and one having a viscosity of higher then 3000 cP is heat-treated at 100° to 130° C. for several tens of minutes for obtaining the intended product. The heating temperature is preferably 100° to 200° C., preferably 100° to 170° C., particularly 120° to 160° C. Though the heat treatment is possible at a temperature below 100° C., an extremely long treatment time is required. A temperature above 200° C. is unsuitable, since coloring and decomposition of Na-CMC are accelerated at such a high temperature.

Also, when the heat treatment conditions are a temperature of higher than 170° C. for a time of 1 hour or longer, coloring and decomposition will take place, although not as severely as in the case of a heat treatment temperature of 200° C. or higher. From the industrial point of view, it is advisable and easy to conduct the heat treatment at a temperature of 170° C. or lower. It is preferred that the treatment conditions of temperature and time are on or within the quadrilateral plane figure defined by lines joining the coordinates 120° C., 0.5 hour
120° C., 2.5 hours
150° C., 2.0 hours
170° C., 0.5 hours in a rectangular coordinate graph of time as one axis of reference and temperature as the other axis of reference. It is especially preferred to use a heat treatment temperature in the range of from 140° to 150° C. and a heat treatment time in the range of from 0.5 to 2.0 hours. To effect the esterification crosslinking reaction by only the heat treatment, the presence of a free carboxylic acid group (cell—$OCH_2COOH$) is indispensable in Na-CMC. The equivalent ratio of the free carboxylic acid group to the Na carboxylate is at least 0.01/100, preferably 0.1 to 2.0. The free carboxylic acid group-containing Na-CMC can be obtained by controlling the pH to 7.5 or below in a neutralization step in the production of Na-CMC. Within the pH range of 7.5 to 6.0, the larger the amount of the free carboxylic acid group, the easier the esterification crosslinking reaction. Therefore, if the equivalent ratio is below 0.01, the prevention of the dissolved lump formation cannot be expected, since the crosslinking centers are too few. The free carboxylic acid group was determined by an acid/alkali titration method in the same manner as in the determination of Na carboxylate.

As described above, the inventors have found that Na-CMC having a quite excellent dispersiblity in water can be obtained by heat-treatment Na-CMC having an equivalent ratio of the free carboxylic acid group to the sodium carboxylate of at least 0.01 to 100 and a viscosity of at least 100 cP (as a 1% aqueous solution) at 100° to 170° C. for several tens of minutes to several hours. The present invention has been completed on the basis of this finding.

When Na-CMC treated according to the present invention is poured in water, it diffuses rapidly on the surface of water and, at the same time, it goes down rapidly in water.

The resulting aqueous solution has an apparent viscosity lower than that of a solution of untreated Na-CMC. If the solution has a high insoluble matter content, an alkaline substance is added to the solution to easily increase the viscosity thereof and also to completely dissolve the insoluble matter. When Na-CMC treated according to the process of the present invention is poured in a weakly alkaline aqueous solution of, for example, sodium carbonate, Na-CMC can be dispersed and completely dissolved therein without the formation of undissolved lumps. More particularly, 2 g of Na-CMC having a degree of substitution of 0.7, a viscosity of 1500 cPs and an equivalent ratio of the free carboxylic acid group to the Na carboxylate of 0.09/100 was heat-treated at 140° C. for 2 h and then poured into 200 ml of an aqueous sodium carbonate solution controlled to pH 10 or 11. In both cases, Na-CMC was rapidly dispersed and the sample particles were completely dissolved to yield a 1% aqueous solution having a viscosity of as high as 1000 cPs.

Na-CMC thus obtained according to the present invention is used in oil drilling and production of fibrous walls, foods, sizes, slurry controlling agents and ceramics. Method of the determination of dispersibility in water has not been standardized yet and, therefore, the following method was employed for convenience' sake. 200 ml of water was charged in a 300 ml beaker. A funnel was fixed at a center at a height of 30 mm from the water surface. 0.5 g of a sample was charged at once in the funnel. The diffusion and sedimentation of the sample were observed while they were kept still. A time required for complete dispersion of 0.5 g of the sample in water was also measured. The dispersibility in water (an effect of preventing the undissolved lump formation) was represented by the time thus determined.

The following examples will further illustrate the present invention.

EXAMPLES 1 TO 6

The following various samples of Na-CMC were heat-treated and dispersibilities of them in pure water were determined. In the tests, time required for dispersing the whole amount of the sample in water was determined by the above-mentioned convenient method while they were kept still. Na-CMC having a water content of 5 to 10% and 80 mesh-pass particle size was used as the starting material. A dryer of hot air circulation type was used for the heat treatment.

The results are shown in Table 1.

TABLE 1

| | Example No. | | | | | |
|---|---|---|---|---|---|---|
| | 1 | 2 | 3 | 4 | 5 | 6 |
| Starting Na—CMC | | | | | | |
| Degree of substitution | 1.1 | 1.1 | 1.1 | 0.7 | 0.7 | 0.9 |
| Viscosity of 1% aqueous solution | 3800 | 2000 | 1500 | 1500 | 430 | 200 |
| Free carboxylic acid group / Sodium carboxylate × 100 | 0.2 | 0.5 | 0.08 | 0.09 | 1.0 | 0.1 |
| Time required for dispersion in water (min) | | | | | | |
| Untreated (Comparative example) | 1* | 2* | 3* | 4* | 5* | 6* |
| Heating conditions | | | | | | |
| 120° C., 1 h | 10 | | | | | |
| 140° C., 1 h | 2 | 35 | 60 | 60 | 120 | |
| 140° C., 2 h | 0.5 | 7 | 10 | 10 | 30 | 70 |

TABLE 1-continued

| | Example No. | | | | | |
|---|---|---|---|---|---|---|
| | 1 | 2 | 3 | 4 | 5 | 6 |
| 170° C., 2 h | | | | | 8 | 20 |

Note
*Na—CMC was hardly dispersed even after leaving the mixture to stand for 4 h and undissolved lumps were formed.

EXAMPLES 7 AND 8

The following additional samples of Na-CMC were heat-treated in the same manner as described for Examples 1 to 6. The results are shown in Table 2.

TABLE 2

| | Example No. | |
|---|---|---|
| | 7 | 8 |
| Starting Na—CMC | | |
| Degree of substitution | 0.7 | 0.7 |
| Viscosity of 1% aqueous solution | 470 | 470 |
| Free carboxylic acid group / sodium carboxylate × 100 | 2.0 | 0.4 |
| Time required for dispersion in water (min) | | |
| Heating conditions | | |
| 150° C., 1 hr | 20 | 35 |
| 150° C., 2 hr | 7 | 15 |
| 160° C., 1 hr | 1 | 10 |

It will be understood from these results that when Na-CMC is treated according to the present invention, it is dispersed completely in a very short time of up to 10 min, though the time varies depending on the conditions, while untreated Na-CMC in Comparative Examples 1 to 6 is not dispersed in water even after 4 h and forms undissolved lumps. It will be understood also that the higher the viscosity of starting CMC, the easier and faster the dispersion in water.

What we claim is:

1. A method of treating a starting sodium carboxymethylcellulose to improve its dispersibility in water, said starting sodium carboxymethylcellulose having a ratio of equivalents of free carboxyl groups/sodium carboxylate of at least 0.01/100, and a 1% aqueous solution of said starting sodium carboxymethylcellulose having a pH in the range from 6.0 to 7.5 and a viscosity of at least 100 cPs, which comprises the steps of: heating said starting sodium carboxymethylcellulose at a temperature in the range of from 100° to 170° C., for a period of time effective to partially react the free carboxyl groups of said sodium carboxymethylcellulose with hydroxyl groups of said sodium carboxymethylcellulose to obtain a modified, cross-linked sodium carboxymethylcellulose which is water-soluble, does not form lumps when it is placed in water and exhibits improved dispersibility when it is placed in water, and wherein an aqueous solution of said modified sodium carboxymethylcellulose has a lower viscosity than an aqueous solution of said starting sodium carboxymethylcellulose.

2. A method as claimed in claim 1 in which said temperature is from 120° to 160° C.

3. A method as claimed in claim 1 in which a 1% aqueous solution of said starting sodium carboxymethylcellulose has a viscosity of from 100 to 1000 cPs, said temperature is 140° C. or higher and the heating time is several hours.

4. A method as claimed in claim 1 in which a 1% aqueous solution of said starting sodium carboxymethylcellulose has a viscosity of from 1000 to 3000 cPs, said temperature is about 140° C. and the heating time is 1 to 2 hours.

5. A method as claimed in claim 1 in which a 1% aqueous solution of said starting sodium carboxymethylcellulose has a viscosity of higher than 3000 cPs, said temperature is from 100° to 130° C. and the heating time is several tens of minutes.

6. A method as claimed in claim 1 in which the treatment time and temperature conditions are on or within the quadrilateral plane figure defined by lines joining the coordinates 120° C., 0.5 hour
120° C., 2.5 hours
150° C., 2.0 hours
170° C., 0.5 hour in a rectangular coordinate graph of time as one axis of reference and temperature as the other axis of reference.

7. A method as claimed in claim 1 in which the ratio of free carboxyl groups to sodium carboxylate groups in the starting sodium carboxymethylcellulose is from 0.1 to 2.0, the temperature is from 140° to 150° C. and said period of time is from 0.5 to 2.0 hours.

* * * * *